(12) United States Patent
Kim et al.

(10) Patent No.: US 11,150,422 B1
(45) Date of Patent: Oct. 19, 2021

(54) OPTICAL CONNECTOR

(71) Applicant: OPTICIS CO., LTD., Seongnam-si (KR)

(72) Inventors: Hee Dae Kim, Buk-gu Gwangju (KR); Il Kim, Gwangju (KR)

(73) Assignee: OPTICIS CO., LTD., Gyeonggi-DO (KR)

( * ) Notice: Subject to any disclaimer, the term of this patent is extended or adjusted under 35 U.S.C. 154(b) by 0 days.

(21) Appl. No.: 16/982,858

(22) PCT Filed: Jun. 21, 2019

(86) PCT No.: PCT/KR2019/007483
§ 371 (c)(1),
(2) Date: Sep. 21, 2020

(87) PCT Pub. No.: WO2020/004872
PCT Pub. Date: Jan. 2, 2020

(30) Foreign Application Priority Data

Jun. 28, 2018 (KR) .................. 10-2018-0074918

(51) Int. Cl.
*G02B 6/42* (2006.01)
(52) U.S. Cl.
CPC .......... *G02B 6/4214* (2013.01); *G02B 6/423* (2013.01); *G02B 6/4243* (2013.01); *G02B 6/4244* (2013.01); *G02B 6/4245* (2013.01)
(58) Field of Classification Search
CPC .............................. G02B 6/4214; G02B 6/423
See application file for complete search history.

(56) References Cited

U.S. PATENT DOCUMENTS 5,898,803 A * 4/1999 Mueller-Fiedler ... G02B 6/4246
385/36
8,777,497 B2 7/2014 Kim et al.
(Continued)

FOREIGN PATENT DOCUMENTS

JP 2017-501439 1/2017
KR 10-2013-0037632 4/2013
(Continued)

OTHER PUBLICATIONS

Korean Notice of Allowance for 10-2018-0074918 dated May 21, 2019.
(Continued)

*Primary Examiner* — Charlie Y Peng
(74) *Attorney, Agent, or Firm* — Nixon Peabody LLP; Jeffrey L. Costellia

(57) ABSTRACT

An optical connector includes: a base substrate; an optical device on the base substrate; an optical fiber optically aligned with the optical device; and a reflective injection-molded part arranged on the base substrate to cover the optical device and providing a reflective surface in an optical path between the optical device and the optical fiber, wherein the reflective injection-molded part includes: a prism providing the reflective surface; an alignment leg supporting the prism in a state in which the prism is at a height from the base substrate; a main block on a side of the prism, the side of the prism being opposite the base substrate; and a plurality of support ribs branching off at intermittent positions along the main block and supporting the prism with respect to the main block.

31 Claims, 12 Drawing Sheets

(56) References Cited

U.S. PATENT DOCUMENTS

| | | | |
|---|---|---|---|
| 9,869,830 B2 | 1/2018 | Son et al. | |
| 10,018,791 B2 | 7/2018 | Heo et al. | |
| 2003/0081885 A1* | 5/2003 | Chen .................... | G02B 6/3582 |
| | | | 385/18 |
| 2003/0123786 A1* | 7/2003 | Yee ...................... | G02B 6/3528 |
| | | | 385/16 |

FOREIGN PATENT DOCUMENTS

| | | | | |
|---|---|---|---|---|
| KR | 10-2016-0017806 | | 2/2016 | |
| KR | 10-2016-0065320 | | 6/2016 | |
| KR | 10-2018-0031262 | | 3/2018 | |
| WO | WO-2013062004 A1 * | 5/2013 | ........... | G02B 6/4214 |

OTHER PUBLICATIONS

International Search Report for PCT/KR2019/007483 dated Oct. 1, 2019.
Written Opinion for PCT/KR2019/007483 dated Oct. 1, 2019.

* cited by examiner

OPTICAL CONNECTOR

CROSS-REFERENCE TO RELATED APPLICATION

This application claims the benefit of Korean Patent Application No. 10-2018-0074918, filed on Jun. 28, 2018, in the Korean Intellectual Property Office, the disclosure of which is incorporated herein in its entirety by reference.

BACKGROUND

1. Field

One or more embodiments relate to an optical connector.

2. Description of the Related Art

Optical connectors may be used to transmit digital visual interface (DVI) signals or high definition multimedia interface (HDMI) signals and may require a structure in which a plurality of optical devices and a plurality of optical fibers are optically aligned to provide a plurality of communication channels.

SUMMARY

One or more embodiments include an optical connector providing a plurality of communication channels and having a simple structure which improves productivity.

Additional aspects will be set forth in part in the description which follows and, in part, will be apparent from the description, or may be learned by practice of the presented embodiments.

According to one or more embodiments, an optical connector includes:
a base substrate;
an optical device on the base substrate;
an optical fiber optically aligned with the optical device; and
a reflective injection-molded part arranged on the base substrate to cover the optical device and providing a reflective surface in an optical path between the optical device and the optical fiber,
wherein the reflective injection-molded part includes:
a prism providing the reflective surface;
an alignment leg supporting the prism in a state in which the prism is at a height from the base substrate;
a main block on a side of the prism, the side of the prism being opposite the base substrate; and
a plurality of support ribs branching off at intermittent positions along the main block and supporting the prism with respect to the main block.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
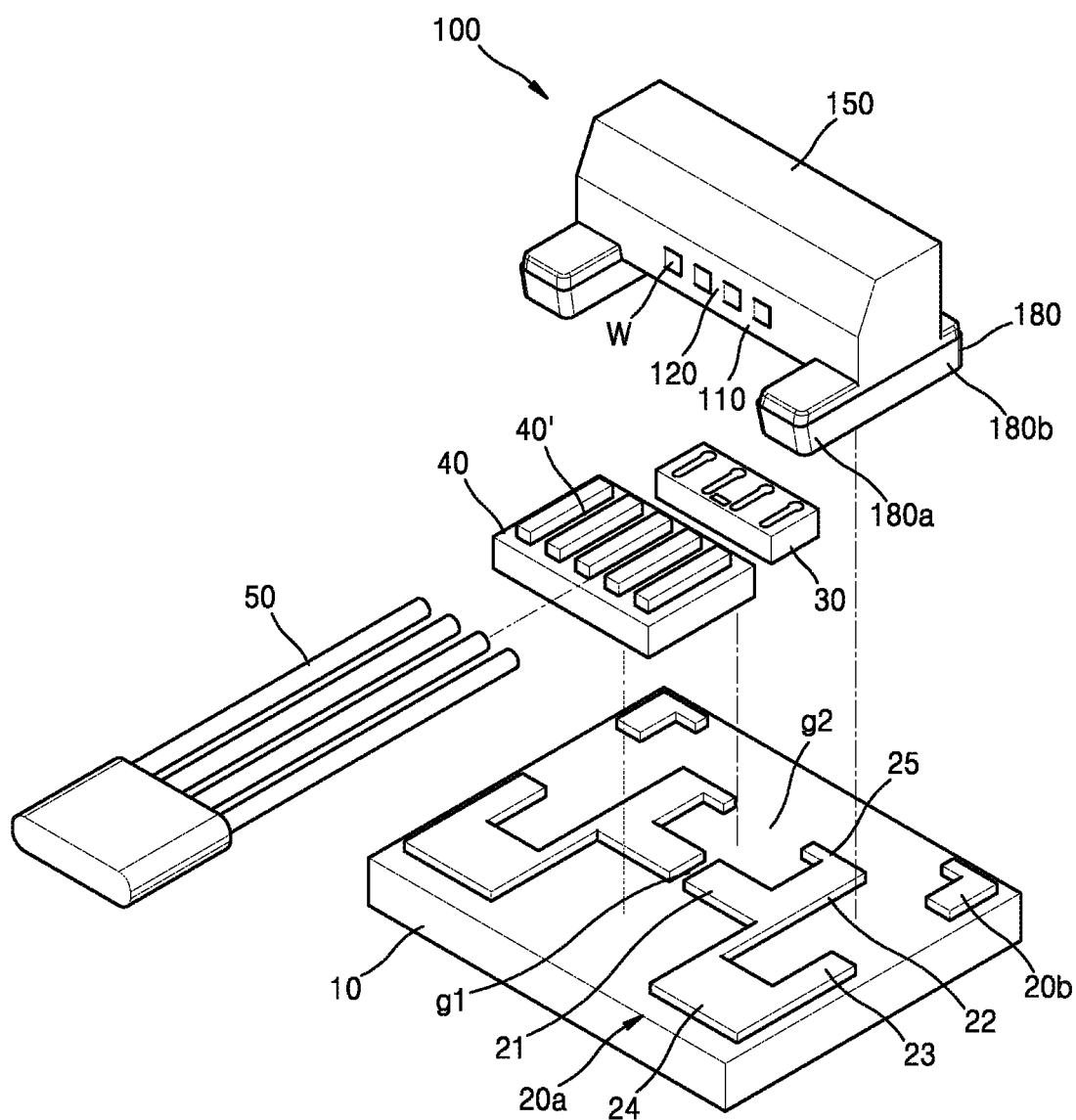
FIG. 1 is an exploded perspective view illustrating an optical connector according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to one or more embodiments, an optical connector includes:
a base substrate;
an optical device on the base substrate;
an optical fiber optically aligned with the optical device; and
a reflective injection-molded part arranged on the base substrate to cover the optical device and providing a reflective surface in an optical path between the optical device and the optical fiber,
wherein the reflective injection-molded part includes:
a prism providing the reflective surface;
an alignment leg supporting the prism in a state in which the prism is at a height from the base substrate;
a main block on a side of the prism, the side of the prism being opposite the base substrate; and
a plurality of support ribs branching off at intermittent positions along the main block and supporting the prism with respect to the main block.

For example, an end portion of the optical fiber may be inserted in an alignment groove of a fiber guide arranged on the base substrate.

For example, a clearance may be provided between the reflective injection-molded part and the alignment groove of the fiber guide.

For example, a front alignment guide may be provided on the base substrate to align the fiber guide, the optical device, and the reflective injection-molded part with each other.

For example, the front alignment guide may include:
a first guide wall extending along between the fiber guide and the optical device; and
a second guide wall extending continuously along between the fiber guide and the reflective injection-molded part and between the optical device and the reflective injection-molded part,
wherein the first and second guide walls may extend in directions crossing each other.

For example, an opening may be formed at a center position of the first guide wall.

For example, the front alignment guide may further include:
a third guide wall extending in parallel to the second guide wall and facing the second guide wall with the reflective injection-molded part therebetween;
a fourth guide wall connecting the second and third guide walls to each other; and
a fifth guide wall extending in parallel to the first guide wall and facing the first guide wall with the optical device therebetween,
wherein the first and fifth guide walls may be connected to each other through the second guide wall.

For example, an opening may be formed at a center position of the fifth guide wall.

For example, a rear alignment guide may be provided on the base substrate at a position spaced apart from the front alignment guide to align the reflective injection-molded part.

For example, the reflective injection-molded part may further include an oblique surface inclined with respect to the base substrate.

For example, at least one oblique surface may be provided on each of the alignment leg, the main block, and the plurality of support ribs of the reflective injection-molded part.

For example, the alignment leg may include a pair of alignment legs at both end positions of the prism.

For example, the alignment leg may be directly on the base substrate.

For example, the alignment leg may include:
a lower block which is directly in contact with the base substrate; and
an upper block provided on a side of the lower block, the side of the lower block being opposite the base substrate.

For example, the alignment leg may further include first and second end portions forming both longitudinal ends of the alignment leg,
the lower block may include an oblique surface of the first end portion and a position alignment surface of the second end portion, and
the upper block may include a first oblique surface of the first end portion and a second oblique surface of the second end portion, the second oblique surface being inclined in a direction opposite a direction in which the first oblique surface is inclined.

For example, the position alignment surface may include a surface perpendicular to the base substrate.

For example, a rear alignment guide may be provided on the base substrate, and the rear alignment guide may align the reflective injection-molded part while making contact with the reflective injection-molded part.

For example, the lower block and the upper block may adjoin each other with a discontinuous boundary therebetween.

For example, the discontinuous boundary may be higher than the rear alignment guide.

For example, a separation space adjoining the reflective surface of the prism may be formed between neighboring support ribs of the plurality of support ribs.

For example, the separation space may be open through a front side of the reflective injection-molded part and may form a window in the front side of the reflective injection-molded part.

For example, the prism may include
a horizontal surface facing the optical device and parallel to the base substrate, a vertical surface facing an end surface of the optical fiber and perpendicular to the base substrate, and the reflective surface obliquely extending to connect the horizontal surface and the vertical surface to each other.

For example, the main block may include a vertical surface extending in parallel to the vertical surface of the prism, an oblique surface obliquely extending from a side of the vertical surface of the main block, and a horizontal surface extending from another side of the vertical surface of the main block in parallel to the base substrate and adjoining the plurality of support ribs.

For example, the plurality of support ribs may include
first oblique surfaces adjoining the reflective surface of the prism, vertical surfaces extending from the vertical surface of the prism in parallel to the vertical surface of the prism, horizontal surfaces adjoining the horizontal surface of the main block and extending in parallel to the horizontal surface of the main block, and second oblique surfaces obliquely extending from the main block toward the prism to connect the horizontal surfaces to the first oblique surfaces.

For example, a bonding space may be formed between the horizontal surface of the main block and the base substrate for wire bonding of the optical device, and the bonding space may be open to the outside of the reflective injection-molded part.

For example, the reflective injection-molded part may further include a fiber guide to align an end portion of the optical fiber.

For example, the end portion of the optical fiber may be inserted into an alignment groove of the fiber guide.

For example, a clearance may be provided between the fiber guide and the prism.

For example, the reflective injection-molded part may further include connection blocks provided on both sides of the clearance to connect the fiber guide and the main block to each other.

For example, a front alignment guide configured to align the optical device and a rear alignment guide configured to align the reflective injection-molded part may be provided on the base substrate.

For example, the front alignment guide may include a first guide wall and a second guide wall which face each other with the optical device therebetween, and
openings may be formed at center positions of the first and second guide walls.

Hereinafter, an optical connector will be described according to an embodiment with reference to the accompanying drawings.

Figure 2:
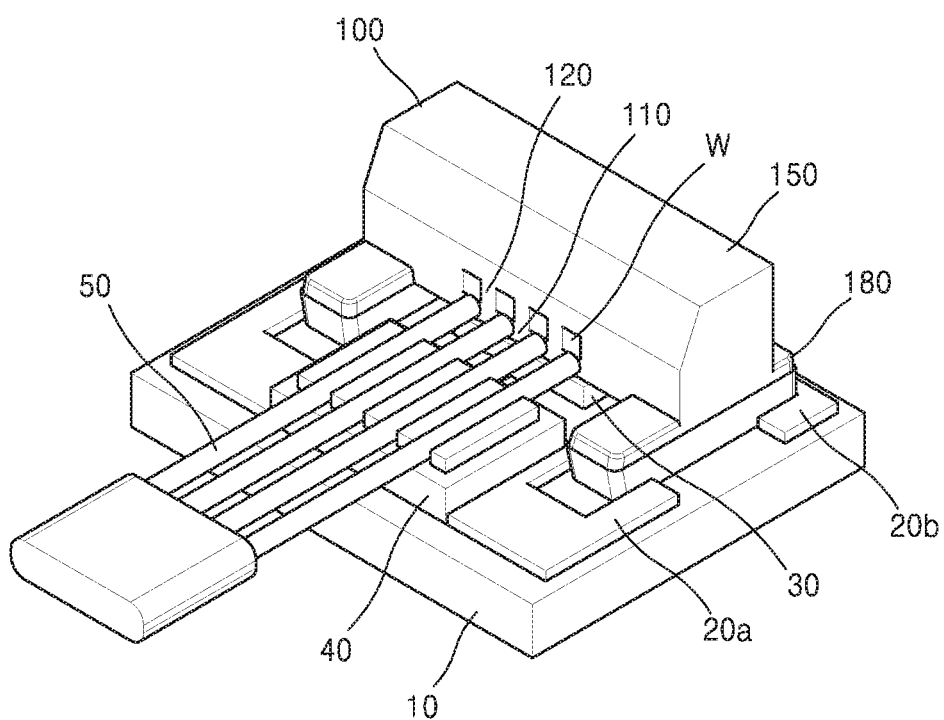
FIG. 2 is a perspective view illustrating the optical connector shown in FIG. 1.
Figure 3:
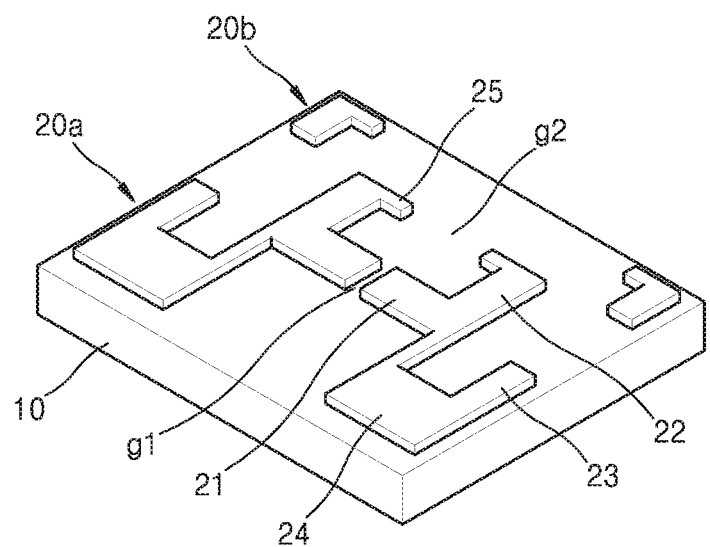
FIGS. 3 and 4 are different perspective views illustrating portions shown in FIG. 1.
Figure 4:
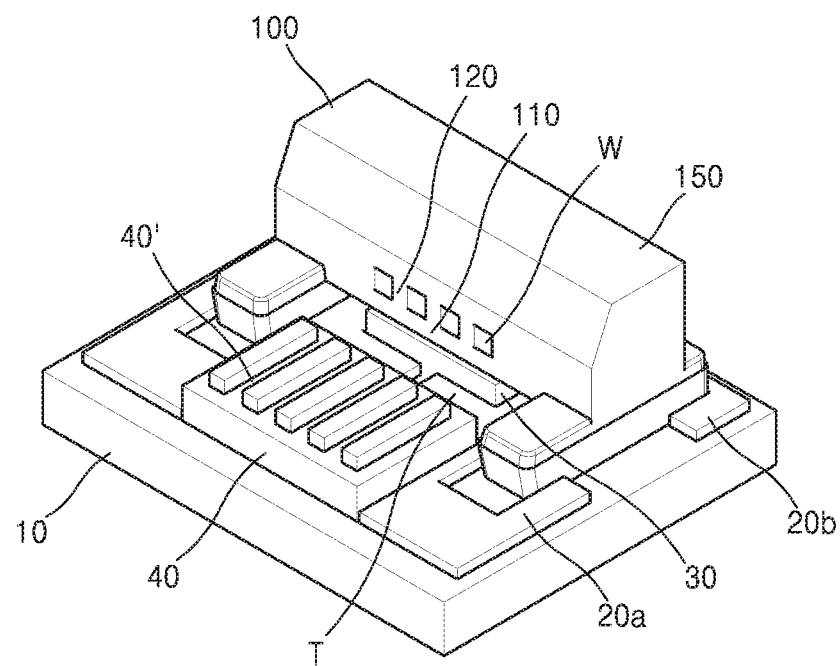

FIG. 1 is an exploded perspective view illustrating an optical connector according to an embodiment. FIG. 2 is a perspective view illustrating the optical connector shown in FIG. 1. FIGS. 3 and 4 are different perspective views illustrating portions shown in FIG. 1.

Referring to FIGS. 1 to 4, the optical connector of the embodiment may include a base substrate 10, an optical device 30 arranged on the base substrate 10, an optical fiber 50 optically aligned with the optical device 30, and a reflective injection-molded part 100 arranged on the base substrate 10 to cover the optical device 30 and providing a reflective surface 110c (refer to FIG. 8) in an optical path between the optical device 30 and the optical fiber 50.

In the present disclosure, the reflective injection-molded part 100 is directly mounted on the base substrate 10 as an optical bench providing the reflective surface 110c (refer to FIG. 8) between the optical device 30 and the optical fiber 50 that are optically aligned with each other to provide a plurality of communication channels, and thus the optical connector may have a simple structure. For example, the base substrate 10 may include a silicon substrate formed through a semiconductor process, and the reflective injection-molded part 100 formed through an injection molding process may be directly mounted on the base substrate 10 formed through a semiconductor process such that the optical connector may have a simple structure. That is, in an embodiment, the reflective injection-molded part 100 formed through an injection molding process may be directly mounted on the base substrate 10, which is formed through a semiconductor process instead of employing a structure in which the reflective injection-molded part 100 and the base substrate 10 are connected to each other using a printed circuit board (PCB) such as a structure in which the reflective injection-molded part 100 and the base substrate 10 are coupled to a PCB, thereby simplifying the overall structure of the optical connector.

In an embodiment, the optical connector may include a plurality of optical devices 30 and a plurality of optical fibers 50, which have a one-to-one correspondence relationship with each other, to provide a plurality of communication channels. For example, at transmitting end sides of communication channels, light output from the optical devices 30 may be input to the optical fibers 50 via the reflective surface 110c (refer to FIG. 9A), and at receiving end sides of communication channels, light output from the optical fibers 50 may be input to the optical devices 30 via the reflective surface 110c (refer to FIG. 9B).

The optical devices 30, the optical fibers 50, and the reflective injection-molded part 100 are supported on the base substrate 10, and a front alignment guide 20a and a rear alignment guide 20b may be provided on the base substrate 10 to align the optical devices 30, the optical fibers 50, and the reflective injection-molded part 100 with each other. The reflective surface 110c (refer to FIG. 8) may be aligned in optical paths between the optical devices 30 and the optical fibers 50 owing to the front alignment guide 20a and the rear alignment guide 20b. For example, at transmitting end sides of the optical fibers 50, light output from the optical devices 30 may be input to end surfaces of the optical fibers 50 via the reflective surface 110c (refer to FIG. 9A), and at receiving end sides of the optical fibers 50, light output from the optical fibers 50 may be input to the optical devices 30 via the reflective surface 110c (refer to FIG. 9B). End portions of the optical fibers 50 may be inserted into alignment grooves 40' of a fiber guide 40 arranged on the base substrate 10. For example, end portions of the optical fibers 50 may be inserted into the alignment grooves 40', respectively.

The front alignment guide 20a provided on the base substrate 10 may include: a first guide wall 21 extending along between the fiber guide 40 and the optical devices 30; and a second guide wall 22 extending continuously along between the fiber guide 40 and the reflective injection-molded part 100 (an alignment leg 180) and between the optical devices 30 and the reflective injection-molded part 100 (the alignment leg 180).

The front alignment guide 20a may align the fiber guide 40, the optical devices 30, and the reflective injection-molded part 100 with each other on the base substrate 10 and may surround at least one corner of each of the fiber guide 40, the optical devices 30, and the reflective injection-molded part 100. For example, the first and second guide walls 21 and 22 of the front alignment guide 20a may be connected to each other to surround a corner of the fiber guide 40 and corners of the optical devices 30. The first and second guide walls 21 and 22 may extend in directions crossing each other, and for example, the first and second guide walls 21 and 22 may be connected to each other while extending in directions perpendicular to each other and parallel to a side (e.g., a long side) and another side (e.g., a short side) of the base substrate 10 and may together surround corners of the fiber guide 40 and the optical devices 30.

The front alignment guide 20a may further include: a third guide wall 23 facing the second guide wall 22 with the reflective injection-molded part 100 (the alignment leg 180) therebetween; and a fourth guide wall 24 connecting the second and third guide walls 22 and 23 to each other, wherein the second to fourth guide walls 22, 23 and 24 may be connected to each other to surround corners of the reflective injection-molded part 100 (the alignment leg 180). For example, the reflective injection-molded part 100 (the alignment leg 180) may be surrounded by the second to fourth guide walls 22, 23, and 24 which are connected to each other in a state in which the second and third guide walls 22 and 23 extend in parallel to the other side (e.g., the short side) of the base substrate 10, and the fourth guide wall 24 extends in parallel to the side (e.g., the long side) of the base substrate 10.

The first guide wall 21 may extend along between the fiber guide 40 and the optical devices 30, and an opening g1 may be formed at a center position of the first guide wall 21. For example, the optical devices 30 may be coupled to the base substrate 10 using a conductive adhesive, and in this case, the opening g1 formed in the first guide wall 21 may provide an accommodation space in which a surplus of the conductive adhesive may be accommodated after the conductive adhesive is applied between the base substrate 10 and the optical devices 30. In addition, the opening g1 formed at the center position of the first guide wall 21 may function as an alignment mark for checking the alignment of the fiber guide 40 and the optical devices 30 that are arranged with the first guide wall 21 therebetween. As described later, an opening g2 may also be formed in a fifth guide wall 25 that faces the first guide wall 21, and in this case, the opening g1 of the first guide wall 21 may be narrower than the opening g2 of the fifth guide wall 25 to function as an alignment mark.

The front alignment guide 20a may further include the fifth guide wall 25 that extends in parallel to the first guide wall 21 and faces the first guide wall 21 with the optical device 30 therebetween. In this case, the first guide wall 21 and the fifth guide wall 25 may be connected to each other through the second guide wall 22. Like the first guide wall 21, the fifth guide wall 25 may include the opening g2 at a center position thereof, and the opening g2 may provide an accommodation space in which a surplus of the conductive adhesive may be accommodated after the conductive adhesive is applied between the optical devices 30 and the base substrate 10.

The front alignment guide 20a may align the alignment leg 180 of the reflective injection-molded part 100, which directly rests on the base substrate 10, and may surround corners of the alignment leg 180. For example, the alignment leg 180 may include first and second end portions 180a and 180b at both longitudinal ends thereof, and in this case, the front alignment guide 20a may surround the first end portion 180a of the alignment leg 180. The rear alignment guide 20b may be provided on the base substrate 10 together with the front alignment guide 20a at a position spaced apart from the front alignment guide 20a. The rear alignment guide 20b may surround the second end portion 180b of the alignment leg 180. As described above, the front alignment guide 20a and the rear alignment guide 20b may respectively surround the first and second end portions 180a and 180b which are both longitudinal end portions of the alignment leg 180. In an embodiment, the reflective injection-molded part 100 may be aligned while being brought into tight contact with one of the front alignment guide 20a and the rear alignment guide 20b. For example, the reflective injection-molded part 100 (the alignment leg 180) may be aligned while being brought into tight contact with the rear alignment guide 20b. As described later, a position alignment surface 182b (refer to FIG. 10) of the alignment leg 180 may be on a side of the second end portion 180b, and the reflective injection-molded part 100 including the alignment leg 180 may be aligned as the position alignment surface 182b (refer to FIG. 10) of the second end portion 180b is brought into contact with the rear alignment guide 20b.

The front and rear alignment guides 20a and 20b may be provided on the base substrate 10 by patterning through a semiconductor process such as a photolithography process. For example, the front and rear alignment guides 20a and 20b may be provided in one piece with the base substrate 10 by etching a silicon substrate or may be provided by selectively etching a polymer layer formed on the base substrate 10. In this case, the front and rear alignment guides 20a and 20b may include vertical surfaces perpendicular to the base substrate 10, and the optical devices 30, the fiber guide 40, and the reflective injection-molded part 100 may include vertical surfaces for surface contact with the vertical surfaces of the front and rear alignment guides 20a and 20b.

The fiber guide 40 to which the end portions of the optical fibers 50 are coupled may be provided at a front position facing the reflective injection-molded part 100. The alignment grooves 40' may be formed in the fiber guide 40 to receive the end portions of the optical fibers 50, and a clearance T (refer to FIG. 4) may be formed between the reflective injection-molded part 100 and the alignment grooves 40' of the fiber guide 40. An adhesive for fixing the fiber guide 40 may be filled in the alignment grooves 40' of the fiber guide 40, and to prevent the case in which the adhesive leaks along the alignment grooves 40' having a narrow width due to the capillary phenomenon, the reflective injection-molded part 100 may be arranged apart from the alignment grooves 40' with the clearance T (refer to FIG. 4) therebetween. The reason for this is that the adhesive flowing along the alignment grooves 40' and touching the reflective injection-molded part 100 may permeate into the optical paths between the optical devices 30 and the optical fibers 50 and may cause optical interference. The clearance T (refer to FIG. 4) between the alignment grooves 40' of the fiber guide 40 and the reflective injection-molded part 100 may be guaranteed by the front alignment guide 20a for aligning the fiber guide 40 and the rear alignment guide 20b for aligning the reflective injection-molded part 100.

The reflective injection-molded part 100 may be formed through an injection molding process, for example, by injecting a molten resin into a mold (not shown) and separating, from the mold, the reflective injection-molded part 100 formed as the molten resin solidifies. The reflective injection-molded part 100 may have a structure for improving injection moldability.

Figure 5:
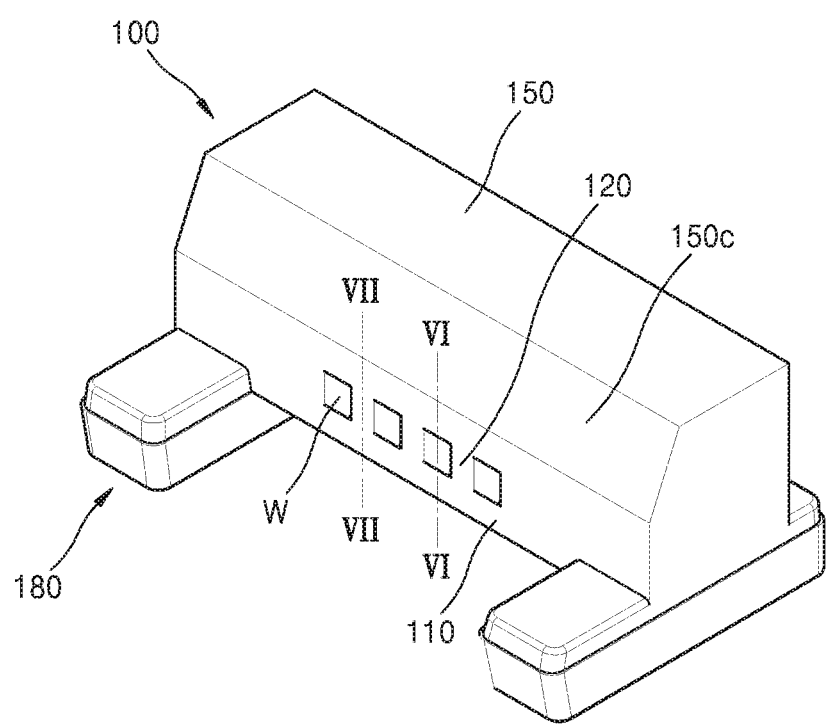
FIG. 5 is an exploded perspective view illustrating a reflective injection-molded part shown in FIG. 1.
Figure 6:
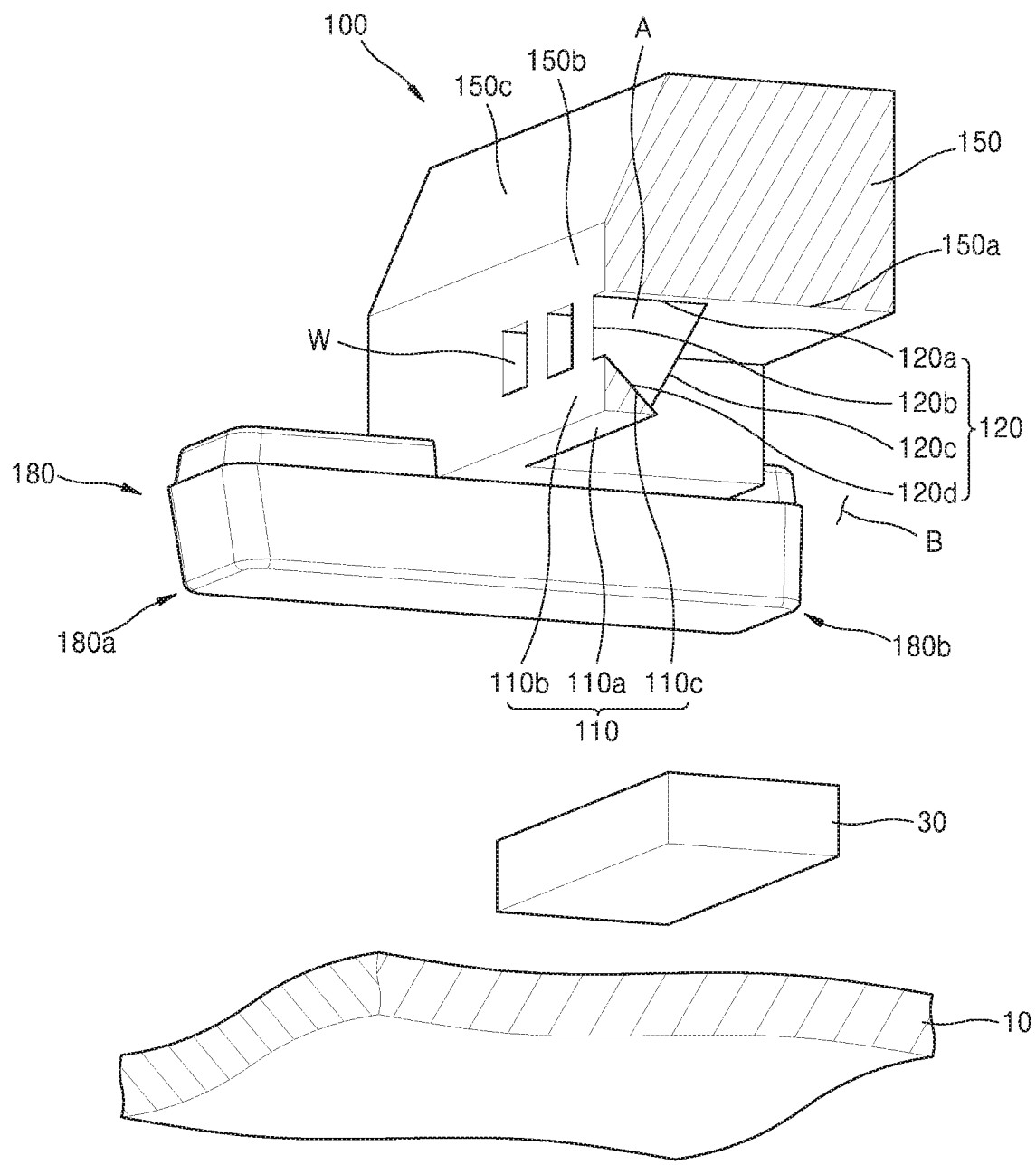
FIGS. 6 and 7 are cut-away views taken along lines VI-VI and VII-VII in FIG. 5 to illustrate the reflective injection-molded part.
Figure 7:
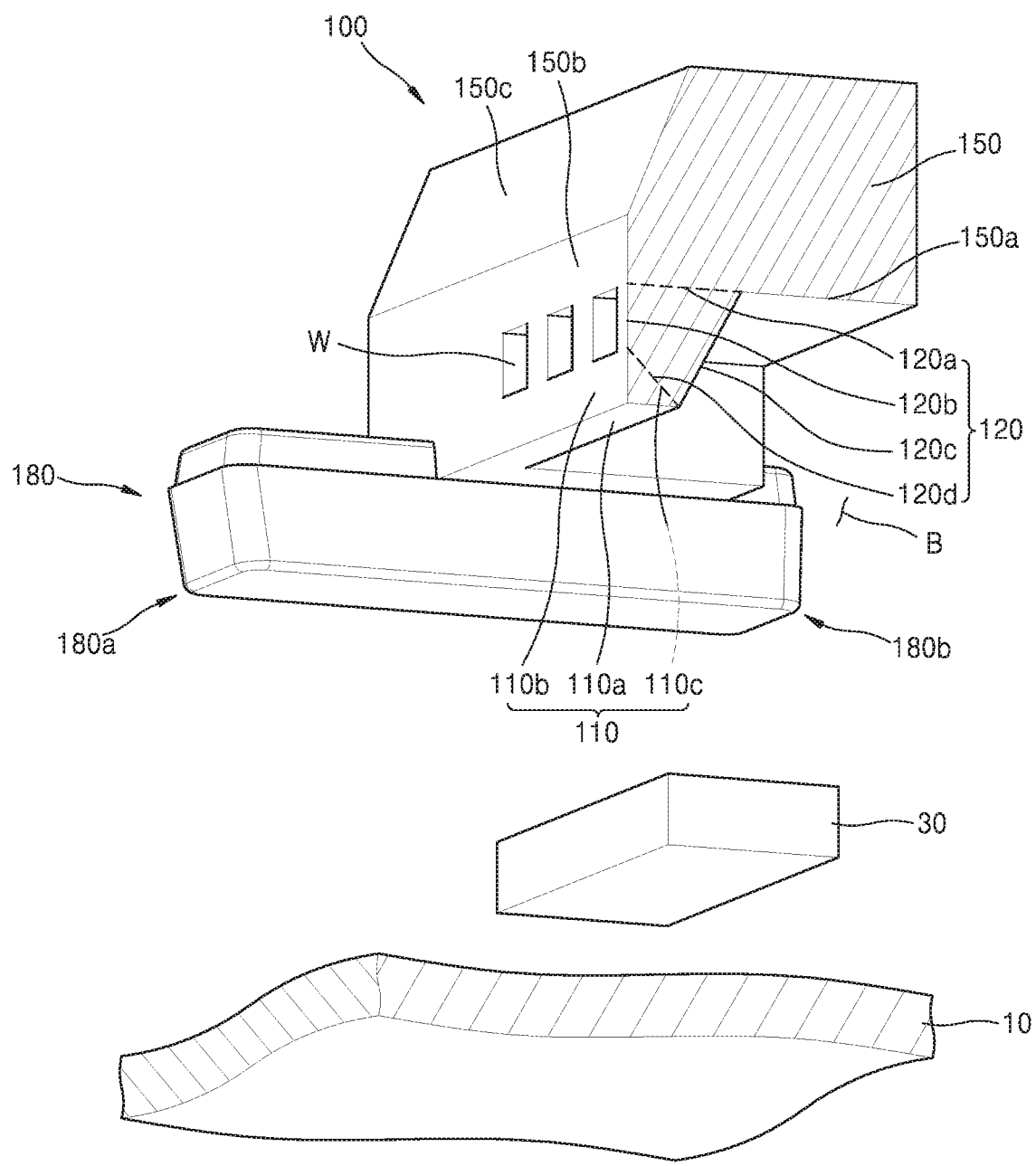
Figure 8:
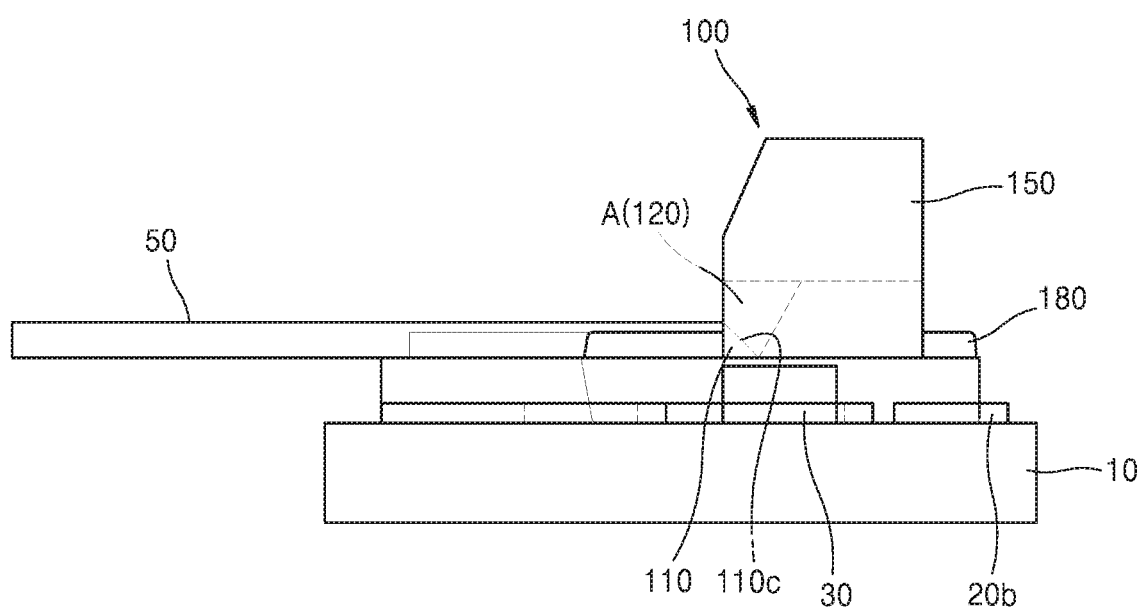
FIG. 8 is a side view illustrating the optical connector shown in FIG. 1.
Figure 9A:
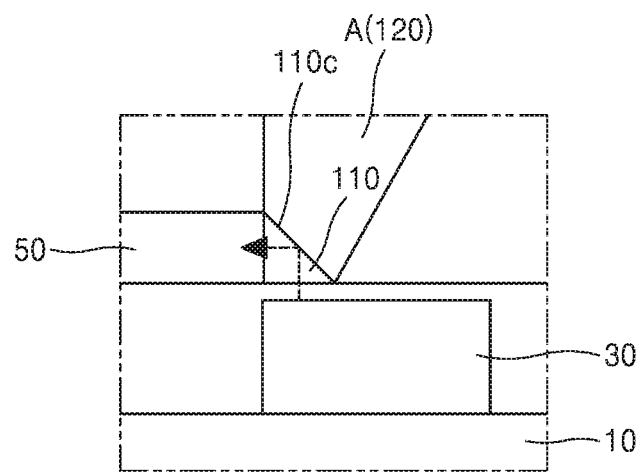
FIGS. 9A and 9B are views respectively illustrating different operations of the optical connector shown in FIG. 8 when the optical connector operates at transmitting end sides of optical fibers and at receiving end sides of optical fibers.
Figure 9B:
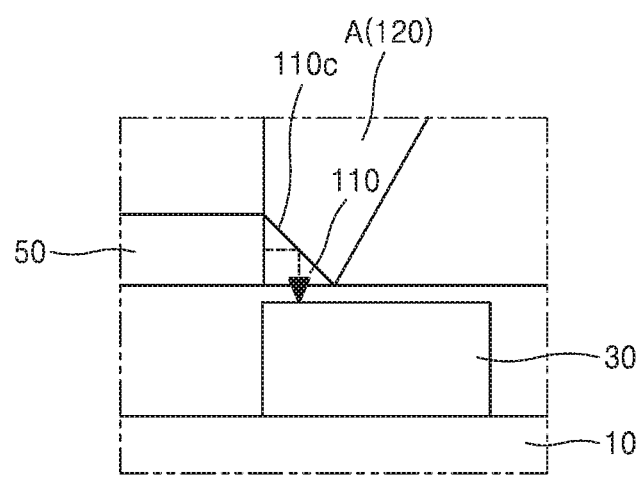

FIG. 5 is an exploded perspective view illustrating the reflective injection-molded part 100 shown in FIG. 1. FIGS. 6 and 7 are cut-away views taken along lines VI-VI and VII-VII in FIG. 5 to illustrate the reflective injection-molded part 100. FIG. 8 is a side view illustrating the optical connector shown in FIG. 1. FIGS. 9A and 9B are views respectively illustrating different operations of the optical connector shown in FIG. 8 when the optical connector operates at transmitting end sides of the optical fibers 50 and at receiving end sides of the optical fibers 50.

Referring to FIGS. 5 to 7, the reflective injection-molded part 100 may include oblique surfaces 120d and 150c inclined with respect to the base substrate 10. That is, the reflective injection-molded part 100 may include: a prism 110 providing the reflective surface 110c between the optical devices 30 and the optical fibers 50; the alignment leg 180 and a main block 150 respectively provided on a side (a lower side) and another side (an upper side) of the prism 110; and a support rib 120 between the main block 150 and the prism 110. As described later, at least one oblique surface such as the oblique surfaces 120d and 150c may be provided on each of the alignment leg 180, the main block 150, and the support rib 120.

The oblique surfaces 120d and 150c are provided at different positions of the reflective injection-molded part 100 for improving workability when the reflective injection-molded part 100 is separated from a mold in an injection molding process, and thus the reflective injection-molded part 100 may not be damaged by physical interface with the mold because the reflective injection-molded part 100 is configured to be easily separated from the mold.

The reflective injection-molded part 100 will now be described. That is, the reflective injection-molded part 100 may include: the prism 110 that provides the reflective surface 110c in the optical paths between the optical devices 30 and the optical fibers 50; the alignment leg 180 that supports the prism 110 in a state in which the prism 110 is at a height from the base substrate 10; the main block 150 provided on a side of the prism 110 opposite to the base substrate 10; and a plurality of support ribs 120 branching off from intermittent positions along the main block 150 to support the prism 110 with respect to the main block 150. In addition, separation spaces A may be formed between the support ribs 120, and windows W connected to the separation spaces A and open to the outside may be formed.

Referring to FIGS. 8 and 9A, the prism 110 may reflect light output from the optical devices 30 to the end surfaces of the optical fibers 50. For example, the prism 110 may include the reflective surface 110c such that a portion of light output from the optical devices 30 may be reflected toward the end surfaces of the optical fibers 50 by the reflective surface 110c. In this case, the optical devices 30 may function as light-emitting devices.

Referring to FIGS. 8 and 9B, the prism 110 may reflect light output from the optical fibers 50 to the optical devices 30. For example, the prism 110 may include the reflective surface 110c such that a portion of light output from the optical fibers 50 may be reflected toward the optical devices 30 by the reflective surface 110*c*. In this case, the optical devices 30 may function as light-receiving devices.

As described later, the reflective surface 110*c* of the prism 110 may adjoin an optical resin of the prism 110 at one side and may form the separation spaces A at the other side such that the reflective surface 110*c* of the prism 110 may form an interface between the optical resin and air that have different refractive indexes.

Referring to FIGS. 6 and 7, the prism 110 may include: a horizontal surface 110*a* parallel to the base substrate 10 and facing the optical devices 30; a vertical surface 110*b* perpendicular to the base substrate 10 and facing the end surfaces of the optical fiber 50; and the reflective surface 110*c* extending obliquely to connect the horizontal surface 110*a* and the vertical surface 110*b* to each other. The reflective surface 110*c* may be at an angle of 45 degrees with respect to the base substrate 10 such that light output from the optical devices 30 may be perpendicularly incident on the end surfaces of the optical fibers 50, and the reflective surface 110*c* may extend at the oblique angle between the horizontal surface 110*a* facing the optical devices 30 and the vertical surface 110*b* facing the end surfaces of the optical fibers 50 to connect the horizontal surface 110*a* and the vertical surface 110*b* to each other. The prism 110 may extend along the optical devices 30 arranged in an array.

The prism 110 may be fixed to the main block 150 through the support ribs 120. That is, the support ribs 120 may be provided at intermittent positions in the length direction of the prism 110 such that the support ribs 120 may be spaced apart from each other, and the prism 110 may be fixed to the main block 150 through the support ribs 120.

The prism 110 may adjoin the separation spaces A (refer to FIG. 6) formed between the support ribs 120 neighboring each other in the length direction of the prism 110. For example, the reflective surface 110*c* of the prism 110 may adjoin the separation spaces A such that the reflective surface 110*c* of the prism 110 may form an interface between different media having different refractive indexes. For example, the prism 110 may be formed in one piece with the reflective injection-molded part 100 through an injection molding process, and when the refractive index of an optical resin included in the reflective injection-molded part 100 is about 1.5, the refractive index of air filled in the separation spaces A may be about 1 such that the reflective surface 110*c* of the prism 110 may form an interface between the optical resin and air having different refractive indexes. The separation spaces A formed between the support ribs 120 neighboring each other in the length direction of the support ribs 120 may be open to the outside of the reflective injection-molded part 100. For example, the separation spaces A may be open to a front side at which the optical fibers 50 are arranged. The separation spaces A may be open to a front side of the reflective injection-molded part 100 and may form the windows W, which are open to the outside at the front side of the reflective injection-molded part 100. The windows W formed by the separation spaces A may be higher than the end surfaces of the optical fibers 50. The end surfaces of the optical fibers 50 may be at a level facing the vertical surface 110*b* of the prism 110, but the windows W formed by the separation spaces A may be higher than the vertical surface 110*b* of the prism 110.

The windows W may be at positions at which the separation spaces A are open to the outside of the reflective injection-molded part 100, and the number of windows W may correspond to the number of optical fibers 50. In the prism 110 optically connected to each of the optical fibers 50, the reflective surface 110*c* may adjoin the optical resin of the prism 110 at one side and may form the separation spaces A at the other side such that the reflective surface 110*c* of the prism 110 may form an interface between different media.

The main block 150 is a portion occupying the largest volume of the reflective injection-molded part 100 and may have a function of improving the fluidity of a molten resin injected into a mold during an injection molding process. That is, since the support ribs 120 branch off from the main block 150, a molten resin injected into a mold through gates (not shown) of the mold may easily flow along the main block 150 having a relatively large width and may then smoothly flow to the support ribs 120 branching downward from the main block 150 such that the support ribs 120 having a relatively small width may be fully filled with the molten resin without a phenomenon in which the molten resin is not fully filled in the support ribs 120 due to flow resistance of the support ribs 120 having a relatively small width and thus cavities (empty spaces) are formed in the support ribs 120.

The main block 150 may include: a vertical surface 150*b* extending in parallel to the vertical surface 110*b* of the prism 110; the oblique surface 150*c* extending obliquely from one side (an upper side) of the vertical surface 150*b*; and a horizontal surface 150*a* extending in parallel to the base substrate 10 from another side (a lower side) of the vertical surface 150*b* and adjoining the support ribs 120.

The oblique surface 150*c* of the main block 150 is for improving workability when the reflective injection-molded part 100 is separated from a mold in an injection molding process, and since the reflective injection-molded part 100 is easily separated from the mold, the reflective injection-molded part 100 may be prevented from being damaged by physical interference with the mold. For example, the oblique surface 150*c* of the main block 150 may extend at an acute angle from the vertical surface 150*b*, and the acute angle between the oblique surface 150*c* and the vertical surface 150*b* may be greater than 0 degrees but less than 45 degrees.

A bonding space B, which is open to a rear side of the reflective injection-molded part 100, may be formed between the base substrate 10 and the horizontal surface 150*a* of the main block 150 for a wire bonding process of the optical devices 30. The optical devices 30 may be electrically connected to the base substrate 10 through the wire bonding process, and the bonding space B may be formed between the base substrate 10 and the horizontal surface 150*a* of the main block 150 for the wire bonding process of the optical devices 30. The bonding space B may be open to the rear side of the reflective injection-molded part 100 to allow wire bonding between electrode pads (not shown) of the base substrate 10 and the optical devices 30.

Each of the support ribs 120 may include: a first oblique surface 120*d* adjoining the reflective surface 110*c* of the prism 110; a vertical surface 120*b* extending in parallel to the vertical surface 110*b* of the prism 110; a horizontal surface 120*a* adjoining the horizontal surface 150*a* of the main block 150 and extending in parallel to the horizontal surface 150*a* of the main block 150; and a second oblique surface 120*c* extending obliquely from the main block 150 toward the prism 110 and connecting the horizontal surface 120*a* and the first oblique surface 120*d* to each other.

The second oblique surface 120*c* of the support rib 120 may improve the fluidity of a molten resin such that the support rib 120 may not have cavities (empty spaces) in which the molten resin is not filled. For example, the second oblique surface 120c of the support rib 120 extends obliquely downward from the main block 150 such that the molten resin may easily flow from the main block 150 to the support rib 120 along the second oblique surface 120c which functions as a guide for the molten resin to easily flow to the support rib 120.

In addition, when the reflective injection-molded part 100 is separated from a mold, physical interference between the support rib 120 and the mold may be reduced owing to the second oblique surface 120c of the support rib 120, and thus the support rib 120 may not be damaged. For example, the second oblique surface 120c of the support rib 120 may be angled to be parallel to the oblique surface 150c of the main block 150.

The reflective injection-molded part 100 may include the alignment leg 180. The alignment leg 180 may support the reflective injection-molded part 100 with respect to the base substrate 10 and may form a rest surface of the reflective injection-molded part 100, which is directly placed on the base substrate 10. A pair of alignment legs 180 may be provided on both sides of the prism 110 to support the prism 110 in a state in which the prism 110 is at a height from the base substrate 10 to guarantee an installation space for the optical devices 30. The alignment leg 180 may support the prism 110 in a state in which the prism 110 is at a height from the base substrate 10 according to the installation height of the optical devices 30 arranged on the base substrate 10, and the installation height of the optical devices 30 may include the height of the optical devices 30 and a height for a wire bonding process for electrically connecting the optical devices 30 to the base substrate 10.

Figure 10:
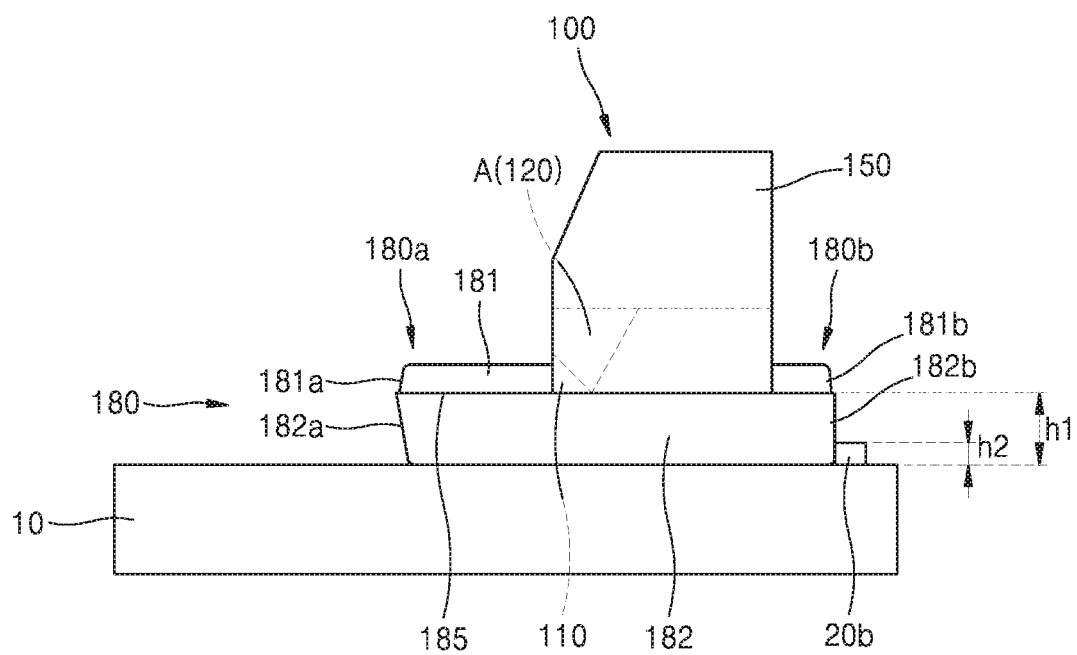
FIG. 10 is a side view of the optical connector shown in FIG. 1 for illustrating an alignment leg.

FIG. 10 is a side view of the optical connector shown in FIG. 1 for illustrating the alignment leg 180.

Referring to FIG. 10, the alignment leg 180 may include a lower block 182 directly adjoining the base substrate 10, and an upper block 181 provided on a side of the lower block 182, which is opposite the base substrate 10. In this case, the lower block 182 and the upper block 181 may adjoin each other with a discontinuous boundary 185 therebetween.

The alignment leg 180 may include the first and second end portions 180a and 180b forming both longitudinal ends of the alignment leg 180; the lower block 182 may include an oblique surface 182a of the first end portion 180a and the position alignment surface 182b of the second end portion 180b; and the upper block 181 may include a first oblique surface 181a of the first end portion 180a and a second oblique surface 181b of the second end portion 180b.

The upper block 181 of the alignment leg 180 may include the first oblique surface 181a of the first end portion 180a and the second oblique surface 181b of the second end portion 180b; and the first and second oblique surfaces 181a and 181b may prevent the alignment leg 180 from being damaged by physical interference with a mold (not shown) when the reflective injection-molded part 100 is separated from the mold. The first and second oblique surfaces 181a and 181b of the upper block 181 may be inclined in opposite directions. The first and second oblique surfaces 181a and 181b are inclined in opposite directions such that the upper block 181 may be easily separated from a mold without being damaged owing to the first and second oblique surfaces 181a and 181b.

The lower block 182 of the alignment leg 180 may include the oblique surface 182a of the first end portion 180a and the position alignment surface 182b of the second end portion 180b, and the oblique surface 182a may prevent the alignment leg 180 from being damaged by physical interference with a mold when the reflective injection-molded part 100 is separated from the mold. The position alignment surface 182b of the alignment leg 180 is for aligning the reflective injection-molded part 100 and may be perpendicular to the base substrate 10. The reflective injection-molded part 100 may be aligned by bringing the position alignment surface 182b into surface contact with the rear alignment guide 20b provided on the base substrate 10, and since the position alignment surface 182b is perpendicular to the base substrate 10, the position alignment surface 182b may not be inclined unlike the oblique surface 182a.

The rear alignment guide 20b may be provided on the base substrate 10 by patterning through a semiconductor process such as a photolithography process. For example, the rear alignment guide 20b may be provided in one piece with the base substrate 10 by etching a silicon substrate or may be provided by selectively etching a polymer layer formed on the base substrate 10. In this case, the rear alignment guide 20b may include a surface perpendicular to the base substrate 10, and the position alignment surface 182b of the lower block 182 may be a vertical surface capable of making surface contact with the surface of the rear alignment guide 20b.

The discontinuous boundary 185 may be formed between the upper block 181 and the lower block 182. In a mold (not shown) for forming the reflective injection-molded part 100, the discontinuous boundary 185 may correspond to a boundary between an upper mold (not shown) for forming the upper block 181 and a lower mold (not shown) for forming the lower block 182, that is, a boundary along which upper and lower molds formed of different parts adjoin each other.

The reflective injection-molded part 100 may be formed using a combination of two molds, that is, an upper mold and a lower mold, instead of being formed using a single continuous mold, and in this case, the discontinuous boundary 185 may be formed between the upper and lower molds that are formed of different parts and adjoin each other, that is, between the upper block 181 and the lower block 182 of the alignment leg 180 that adjoin each other.

The discontinuous boundary 185 between the upper block 181 and the lower block 182 may be at a height beyond the rear alignment guide 20b. That is, the height h1 of the discontinuous boundary 185 may be greater than the height h2 of the rear alignment guide 20b. For example, although the rear alignment guide 20b is provided to align the alignment leg 180, since the rear alignment guide 20b is not brought into stable surface contact with the discontinuous boundary 185 of the alignment leg 180, the reflective injection-molded part 100 including the alignment leg 180 may not be properly aligned by contact between the rear alignment guide 20b and the discontinuous boundary 185.

For example, the rear alignment guide 20b, which is formed as a pattern on the base substrate 10 through a semiconductor process, may include a surface perpendicular to the base substrate 10; the position alignment surface 182b of the lower block 182 may form a vertical surface for surface contact with the surface of the rear alignment guide 20b; and the discontinuous boundary 185 may not be located on the position alignment surface 182b.

The alignment leg 180 may extend outward from the main block 150 in forward and backward directions. That is, the alignment leg 180 may extend from a front position ahead of the main block 150 to a rear position behind the main block 150, and since the alignment leg 180 is long in the forward and backward directions, the reflective injection-molded part 100 may be stably supported by the alignment leg 180.

Figure 11:
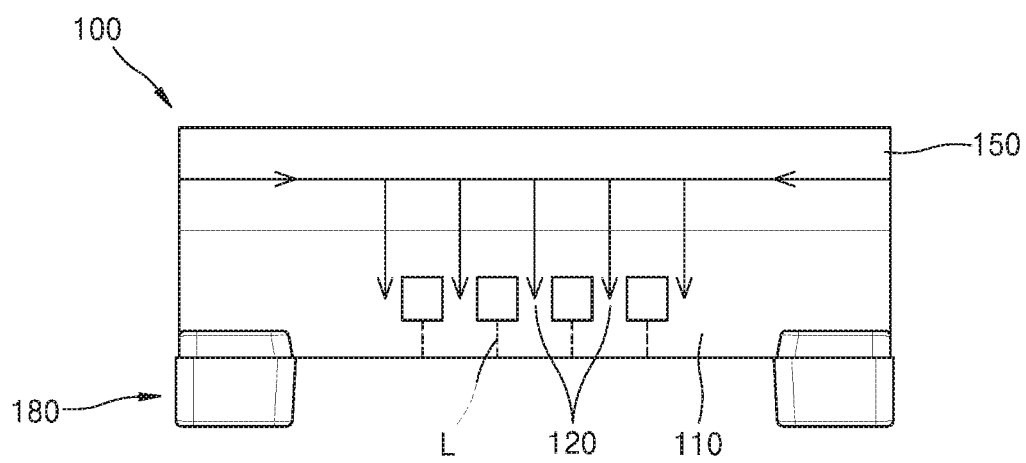
FIG. 11 is a view illustrating a forming process of the reflective injection-molded part.

FIG. 11 is a view illustrating a process of forming the reflective injection-molded part 100.

Referring to FIG. 11, in the process of forming the reflective injection-molded part 100, a molten resin injected into a mold (not shown) first fills the main block 150 while flowing along the main block 150 having a relatively large width, and then fills the support ribs 120 while flowing along the support ribs 120 which have a relatively small width and branch downward from the main block 150. After filling the support ribs 120 and flowing downward, the molten resin fills the prism 110 adjoining the support ribs 120.

According to the time sequence of the formation of the reflective injection-molded part 100, the main block 150, the support ribs 120 branching off from the main block 150, and the prism 110 connected to the support ribs 120 may be sequentially formed, and connection lines L along which streams of the molten resin meet each other may be formed in the prism 110 to which the support ribs 120 neighboring each other are connected. The connection lines L may be formed as adjacent streams of the molten resin meet each other while flowing along the support ribs 120 branching off in parallel to each other from intermittent positions of the main block 150. That is, a connection line L may be formed as a stream of the molten resin flowing along a support rib 120 meets, at the prism 110, another stream of the molten resin flowing along a neighboring support rib 120, and the prism 110 may be filled with the molten resin as such neighboring streams of the molten resin meet each other. The connection lines L of the prism 110 may be formed in regions not affecting the optical paths of the optical devices 30, that is, the optical paths between the optical devices 30 and the optical fibers 50.

The reflective injection-molded part 100 may be formed through an injection molding process in which a molten resin having a uniform composition is injected into a mold and solidified in a shape corresponding to the mold, and thus the reflective injection-molded part 100 may have a uniform composition, that is, a uniform optical resin and may be provided in one piece. In an embodiment, the reflective injection-molded part 100 may include an optical resin such as APEL series.

Assembling of the optical connector will now be described according to an embodiment with reference to FIG. 1. That is, the optical devices 30, the reflective injection-molded part 100, and the fiber guide 40 are arranged on the base substrate 10 on which the front alignment guide 20a and the rear alignment guide 20b are provided. At this time, the optical devices 30, the reflective injection-molded part 100, and the fiber guide 40 may be aligned with each other and arranged in place owing to the front alignment guide 20a and the rear alignment guide 20b provided on the base substrate 10. Then, the optical fibers 50 may be inserted into the fiber guide 40 placed on the base substrate 10 by inserting the end portions of the optical fibers 50 into the alignment grooves 40' of the fiber guide 40. The optical fibers 50 may be aligned as being respectively inserted into the alignment grooves 40'. Next, the optical fibers 50 inserted into the fiber guide 40 may be pressed toward the reflective injection-molded part 100 to slide the optical fibers 50 along the alignment grooves 40' of the fiber guide 40 until the end portions of the optical fibers 50 are brought into contact with the reflective injection-molded part 100, and in this manner, the optical fibers 50 may be guided to positions at which the optical fibers 50 make contact with the reflective injection-molded part 100 (for example, the vertical surface 110b shown in FIG. 6). At this time, the contact between the end portions of the optical fibers 50 and the reflective injection-molded part 100 (for example, the vertical surface 110b shown in FIG. 6) may be visually inspected from an upper side of the reflective injection-molded part 100 using a microscope or may be inspected by processing images taken using a photographing device provided at the upper side of the reflective injection-molded part 100, and owing to the oblique surface 150c (refer to FIG. 6) provided at an upper position of the reflective injection-molded part 100 (for example, the vertical surface 110b shown in FIG. 6), the contact between the end portions of the optical fibers 50 and the reflective injection-molded part 100 (for example, the vertical surface 110b shown in FIG. 6) may be easily inspected. That is, the oblique surface 150c (refer to FIG. 6) of the reflective injection-molded part 100 may be inclined such that the contact between the end portions of the optical fibers 50 and the reflective injection-molded part 100 (for example, the vertical surface 110b shown in FIG. 6) may be exposed to the outside.

As described above, the oblique surface 150c (refer to FIG. 6) of the reflective injection-molded part 100 may improve the workability of demolding such that the reflective injection-molded part 100 may be easily separated from a mold, and along with this, the oblique surface 150c may improve the alignment of the optical fibers 50 because the contact between the end portions of the optical fibers 50 and the reflective injection-molded part 100 is easily shown from the outside owing to the oblique surface 150c.

Hereinafter, an optical connector will be described according to another embodiment.

Figure 12:
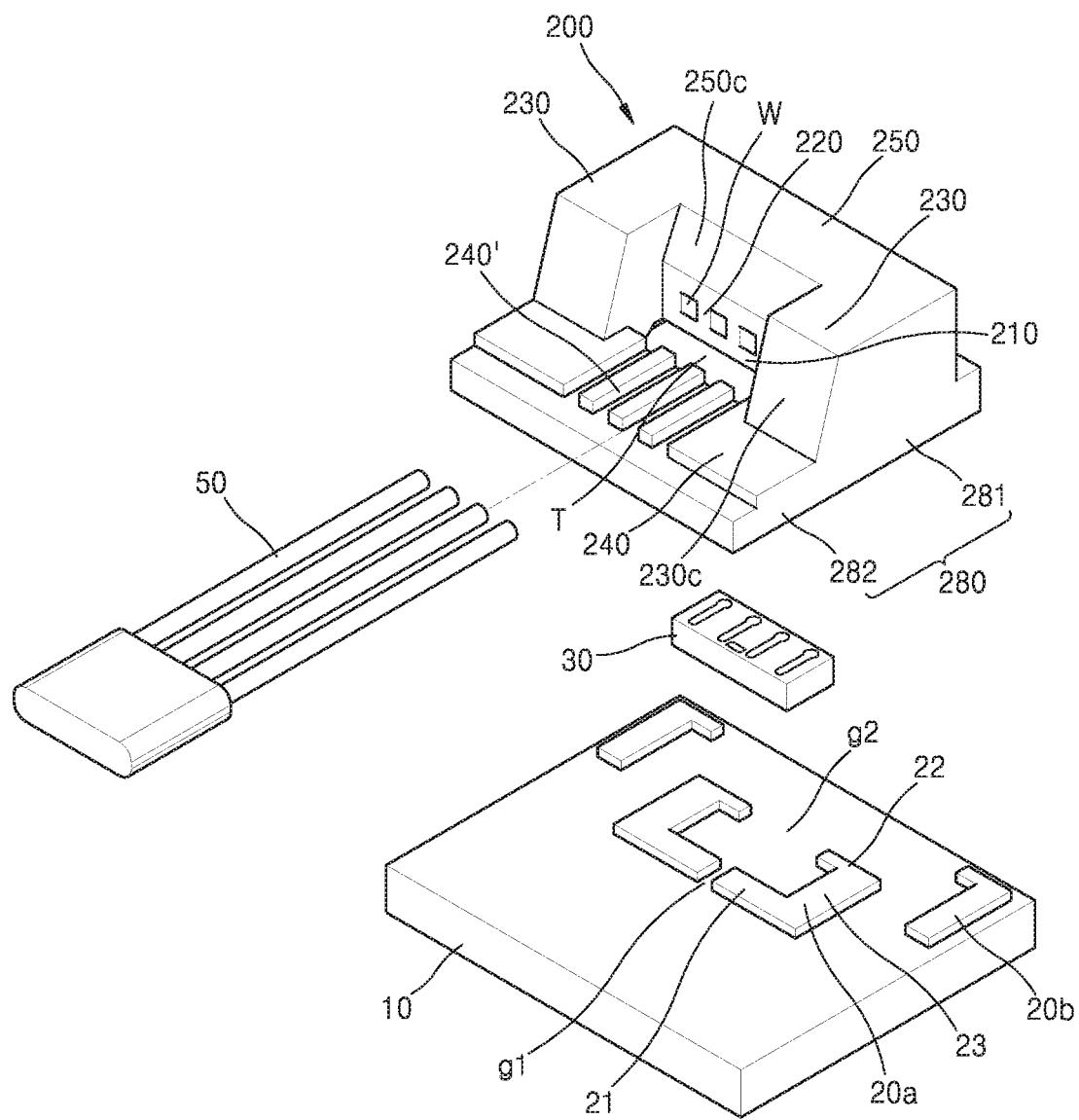
FIG. 12 is an exploded perspective view illustrating an optical connector according to another embodiment.
Figure 13:
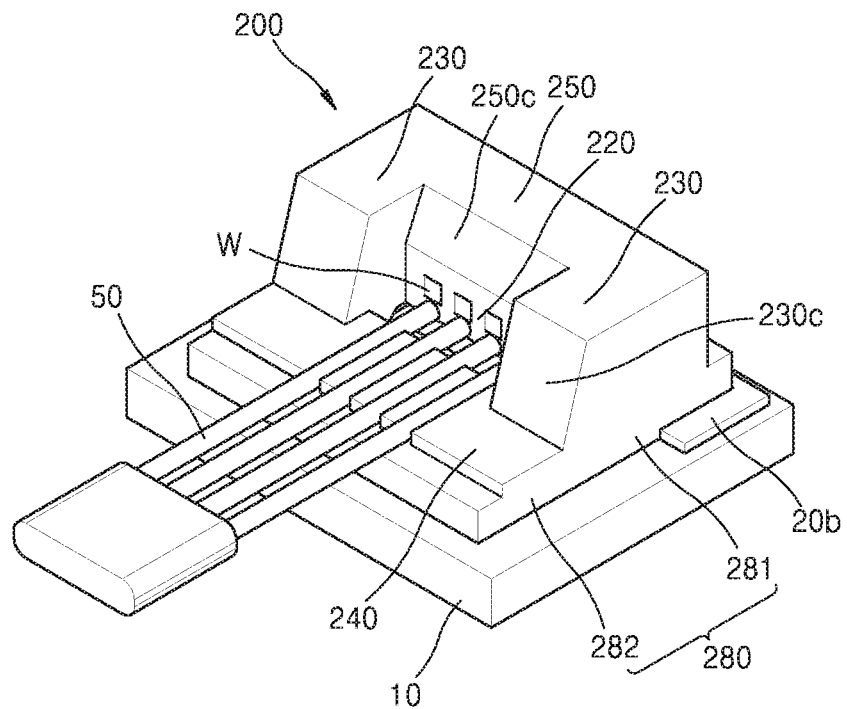
FIG. 13 is a perspective view illustrating the optical connector shown in FIG. 12.
Figure 14:
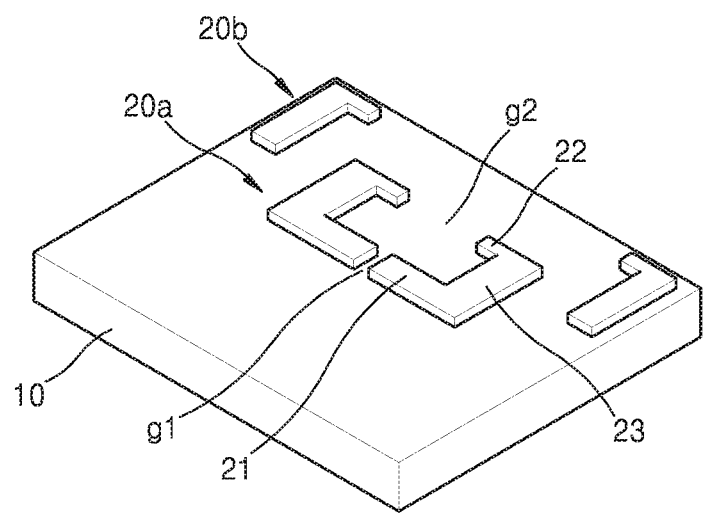
FIGS. 14 and 15 are perspective views illustrating portions of the optical connector shown in FIG. 12.
Figure 15:
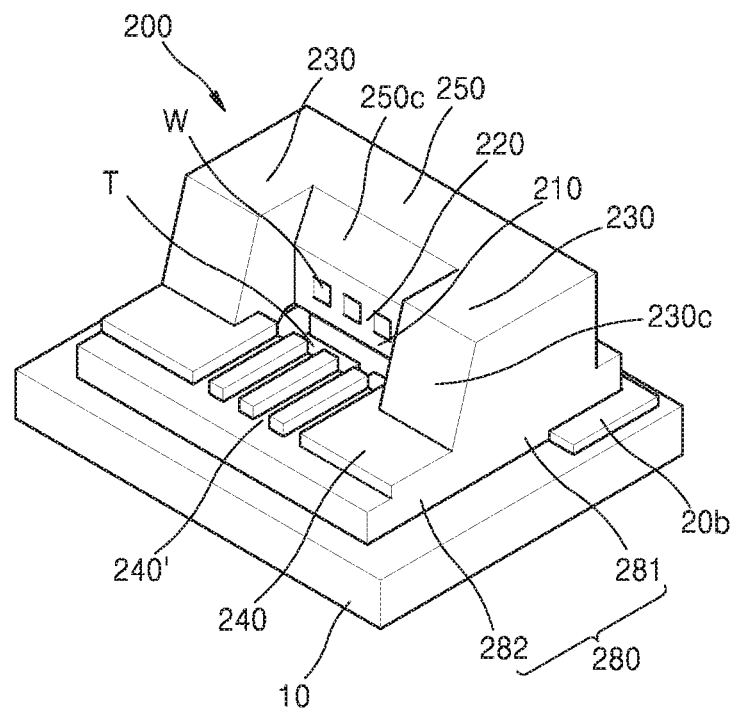
Figure 16:
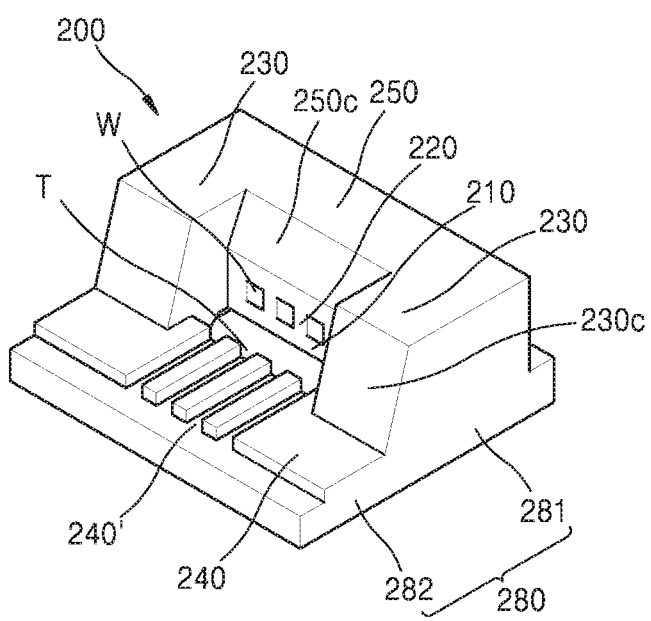
FIGS. 16 and 17 are different perspective views illustrating a reflective injection-molded part shown in FIG. 12.
Figure 17:
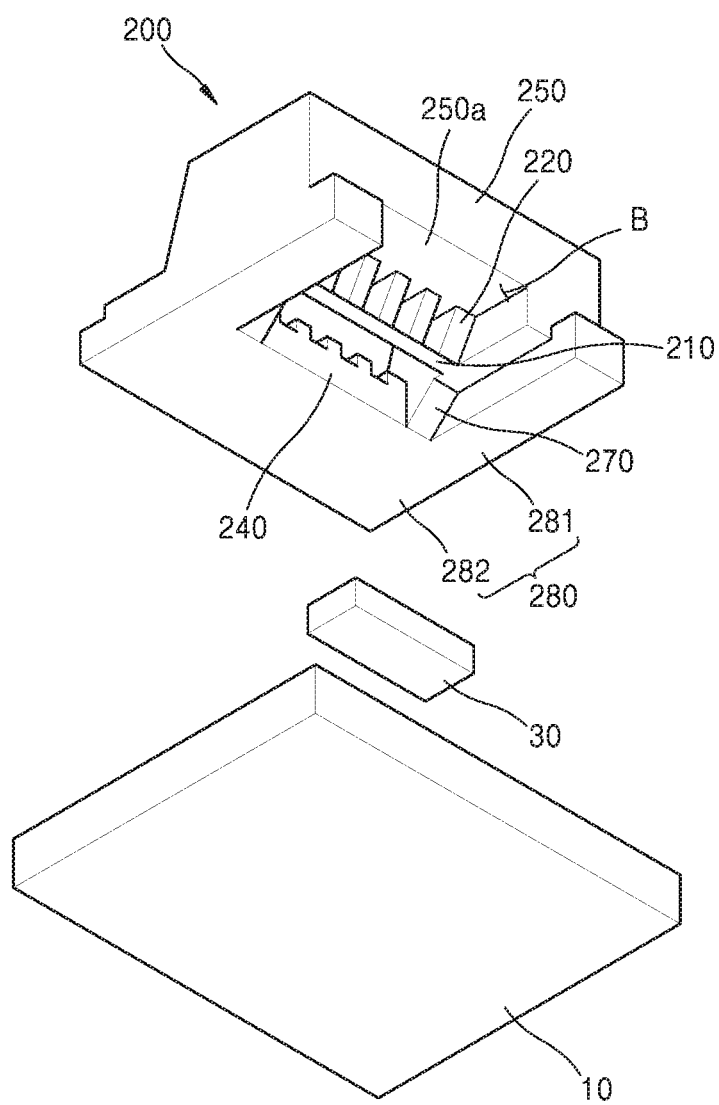

FIG. 12 is an exploded perspective view illustrating an optical connector according to another embodiment. FIG. 13 is a perspective view illustrating the optical connector shown in FIG. 12. FIGS. 14 and 15 are perspective views illustrating portions of the optical connector shown in FIG. 12. FIGS. 16 and 17 are different perspective views illustrating a reflective injection-molded part shown in FIG. 12.

Referring to FIGS. 12 to 17, the optical connector of the embodiment may include a base substrate 10, optical devices 30 arranged on the base substrate 10, optical fibers 50 optically aligned with the optical devices 30, and a reflective injection-molded part 200 arranged on the base substrate 10 to cover the optical devices 30 and providing a reflective surface (a prism 210) in optical paths between the optical devices 30 and the optical fibers 50.

The reflective injection-molded part 200 may include: the prism 210 that provides the reflective surface; an alignment leg 280 that supports the prism 210 in a state in which the prism 210 is at a height from the base substrate 10; a main block 250 provided on a side of the prism 210 opposite to the base substrate 10; and a plurality of support ribs 220 branching off from intermittent positions along the main block 250 to support the prism 210 with respect to the main block 250.

In the present embodiment, the reflective injection-molded part 200 may further include a fiber guide 240 for aligning end portions of the optical fibers 50, and the end portions of the optical fibers 50 may be inserted into alignment grooves 240' of the fiber guide 240.

Unlike the reflective injection-molded part 100 shown in FIG. 1, the reflective injection-molded part 200 of the present embodiment may include the fiber guide 240, configured to align the optical fibers 50, as a portion formed in one piece with the reflective injection-molded part 200 such that the fiber guide 240 configured to align the optical fibers 50 may be formed through a single injection molding process together with the reflective surface (the prism 210) to be placed in the optical paths of the optical fibers 50.

In the present embodiment, since the fiber guide 240 is automatically aligned when the reflective injection-molded part 200 is aligned, the structure of a front alignment guide 20*a* provided on the base substrate 10 may be simple. That is, the front alignment guide 20*a* provided on the base substrate 10 for aligning the optical devices 30 may include first and second guide walls 21 and 22 facing each other with the optical devices 30 therebetween but may not include a structure for aligning the fiber guide 240.

The first and second guide walls 21 and 22 are for aligning the optical devices 30, and openings g1 and g2 may be formed at center positions of the first and second guide walls 21 and 22. The openings g1 and g2 of the first and second guide walls 21 and 22 may provide a space for accommodating a surplus of an adhesive applied between the optical devices 30 and the base substrate 10. The opening g1 formed at the center position of the first guide wall 21 may also serve as an alignment mark for checking the alignment of the optical devices 30, and for this, the opening g1 may be narrower than the opening g2.

The first and second guide walls 21 and 22 may be connected to each other by a third guide wall 23 extending in a direction crossing the first and second guide walls 21 and 22. For example, the first and second guide walls 21 and 22 may extend in a direction parallel to one side (e.g., a long side) of the base substrate 10, and the third guide wall 23 may extend in a direction parallel to another side (e.g., a short side) of the base substrate 10.

The front alignment guide 20*a* for aligning the optical devices 30 and a rear alignment guide 20*b* for aligning the reflective injection-molded part 200 may be provided on the base substrate 10, and the fiber guide 240 provided as part of the reflective injection-molded part 200 may be automatically aligned when the reflective injection-molded part 200 is aligned.

A clearance T may be formed between the fiber guide 240 and the prism 210. For example, the clearance T may be formed between the alignment grooves 240' of the fiber guide 240 and the prism 210. An adhesive for fixing the fiber guide 240 may be filled in the alignment grooves 240' of the fiber guide 240, and to prevent the case in which the adhesive leaks along the alignment grooves 240' having a narrow width due to the capillary phenomenon, the prism 210 may be spaced apart from the fiber guide 240 by the clearance T. The reason for this is that the adhesive flowing along the alignment grooves 240' and touching the prism 210 may permeate into the optical paths between the optical devices 30 and the optical fibers 50 and may cause optical interference.

The reflective injection-molded part 200 may include a connection block 230 connecting the main block 250 and the fiber guide 240 to each other. For example, a pair of connection blocks 230 may be provided at both sides of the clearance T to connect the main block 250 and the fiber guide 240 to each other. The connection block 230 may include an oblique surface 230*c* to facilitate demolding of the reflective injection-molded part 200 and prevent the reflective injection-molded part 200 from being damaged by physical interference with a mold. The oblique surface 230*c* of the connection block 230 may be parallel to an oblique surface 250*c* of the main block 250 and may extend from the fiber guide 240 in an oblique direction with respect to the base substrate 10.

The reflective injection-molded part 200 may include the alignment leg 280, which is directly arranged on the base substrate 10 to support the reflective injection-molded part 200 and align the reflective injection-molded part 200 while making contact with the rear alignment guide 20*b* of the base substrate 10. In the present embodiment, the alignment leg 280 may form a lower base of the reflective injection-molded part 200 and may support the prisms 210 at a height from the base substrate 10 and the fiber guide 240 at a height corresponding to the prism 210 such that the end portions of the optical fibers 50 coupled to the fiber guide 240 may face the prism 210. For example, end surfaces of the optical fibers 50 inserted into the alignment grooves 240' of the fiber guide 240 may face a vertical surface of the prism 210. For example, the alignment leg 280 may include: a pair of leg portions 281 provided on both sides of the prism 210 in the length direction of the prism 210; and a base 282 connecting the pair of leg portions 281 to each other and supporting the fiber guide 240.

The alignment leg 280 may extend outward from the main block 150 in forward and backward directions. That is, the alignment leg 280 may extend from a front position ahead of the main block 250 to a rear position behind the main block 250, and since the alignment leg 280 is long in the forward and backward directions, the reflective injection-molded part 200 may be stably supported by the alignment leg 280. In the present embodiment, the fiber guide 240 for aligning the optical fibers 50 may be supported by the alignment leg 280 at a front position of the main block 250.

Although not shown in FIGS. 12 to 17, the alignment leg 280 may include a lower block (not shown) directly adjoining the base substrate 10, and an upper block (not shown) provided on a side of the lower block, which is opposite the base substrate 10. In this case, the lower block and the upper block may adjoin each other with a discontinuous boundary (not shown) therebetween. In this case, the upper block (not shown) may include oblique surfaces (not shown) inclined in opposite directions at both front and rear end portions of the upper block; the lower block (not shown) may include an oblique surface (not shown) and an alignment surface (not shown) at both front and rear end portions of the lower block, respectively; and the alignment surface (not shown) may include a vertical surface for contact with the rear alignment guide 20*b*.

Referring to FIG. 17, a bonding space B, which is open to a rear side of the reflective injection-molded part 200, may be formed between the base substrate 10 and a horizontal surface 250*a* of the main block 250 for a wire bonding process of the optical devices 30. In the present embodiment, the bonding space B may have a large width between the leg portions 281 of the alignment leg 280, and cut portions 270 may be formed at positions adjacent to the leg portions 281 to increase the width of the bonding space B. Oblique surfaces may be formed on sides of the cut portions 270, and the oblique surfaces of the cut portions 270 may obliquely extend downward from the main block 250 to improve the fluidity of a molten resin. In addition, the oblique surfaces of the cut portions 270 may reduce physical interference between the reflective injection-molded part 200 and a mold when the reflective injection-molded part 200 is separated from the mold.

As described above, according to the one or more of the above embodiments, the reflective injection-molded part, which provides the reflective surface between the optical devices and the optical fibers that are optically aligned with each other, may be directly mounted on the base substrate as an optical bench supporting the optical devices and the optical fibers, and thus the optical connector may have a simple structure.

In addition, since the structure of the reflective injection-molded part is designed by considering injection moldability, the fluidity of a molten resin may be sufficiently guaranteed during an injection molding process, and the reflective injection-molded part may be easily separated from a mold, improving productivity.

The present disclosure may be applied to optical connectors supporting a plurality of communication channels, and various devices including optical connectors.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An optical connector comprising:
a base substrate;
an optical device on the base substrate;
an optical fiber optically aligned with the optical device; and
a reflective injection-molded part arranged on the base substrate to cover the optical device and providing a reflective surface in an optical path between the optical device and the optical fiber,
wherein the reflective injection-molded part comprises:
a prism providing the reflective surface;
an alignment leg supporting the prism in a state in which the prism is at a height from the base substrate;
a main block on a side of the prism, the side of the prism being opposite the base substrate; and
a plurality of support ribs branching off at intermittent positions along the main block and supporting the prism with respect to the main block.

2. The optical connector of claim 1, wherein
an end portion of the optical fiber is inserted in an alignment groove of a fiber guide arranged on the base substrate.

3. The optical connector of claim 2, wherein
a clearance is provided between the reflective injection-molded part and the alignment groove of the fiber guide.

4. The optical connector of claim 2, wherein
a front alignment guide is provided on the base substrate to align the fiber guide, the optical device, and the reflective injection-molded part with each other.

5. The optical connector of claim 4, wherein
the front alignment guide comprises:
a first guide wall extending along between the fiber guide and the optical device; and
a second guide wall extending continuously along between the fiber guide and the reflective injection-molded part and between the optical device and the reflective injection-molded part,
wherein the first and second guide walls extend in directions crossing each other.

6. The optical connector of claim 5, wherein
an opening is formed at a center position of the first guide wall.

7. The optical connector of claim 5, wherein
the front alignment guide further comprises:
a third guide wall extending in parallel to the second guide wall and facing the second guide wall with the reflective injection-molded part therebetween;
a fourth guide wall connecting the second and third guide walls to each other; and a fifth guide wall extending in parallel to the first guide wall and facing the first guide wall with the optical device therebetween,
wherein the first and fifth guide walls are connected to each other through the second guide wall.

8. The optical connector of claim 7, wherein
an opening is formed at a center position of the fifth guide wall.

9. The optical connector of claim 4, wherein
a rear alignment guide is provided on the base substrate at a position spaced apart from the front alignment guide to align the reflective injection-molded part.

10. The optical connector of claim 1, wherein
the reflective injection-molded part further comprises an oblique surface inclined with respect to the base substrate.

11. The optical connector of claim 10, wherein
at least one oblique surface is provided on each of the alignment leg, the main block, and the plurality of support ribs of the reflective injection-molded part.

12. The optical connector of claim 1, wherein
the alignment leg comprises a pair of alignment legs at both end positions of the prism.

13. The optical connector of claim 1, wherein
the alignment leg is directly on the base substrate.

14. The optical connector of claim 1, wherein
the alignment leg comprises:
a lower block which is directly in contact with the base substrate; and
an upper block provided on a side of the lower block, the side of the lower block being opposite the base substrate.

15. The optical connector of claim 14, wherein
the alignment leg further comprises first and second end portions forming both longitudinal ends of the alignment leg,
the lower block comprises an oblique surface of the first end portion and a position alignment surface of the second end portion, and
the upper block comprises a first oblique surface of the first end portion and a second oblique surface of the second end portion, the second oblique surface being inclined in a direction opposite a direction in which the first oblique surface is inclined.

16. The optical connector of claim 15, wherein
the position alignment surface comprises a surface perpendicular to the base substrate.

17. The optical connector of claim 15, wherein
a rear alignment guide is provided on the base substrate, and the rear alignment guide aligns the reflective injection-molded part while making contact with the reflective injection-molded part.

18. The optical connector of claim 17, wherein
the lower block and the upper block adjoin each other with a discontinuous boundary therebetween.

19. The optical connector of claim 18, wherein
the discontinuous boundary is higher than the rear alignment guide.

20. The optical connector of claim 1, wherein
a separation space adjoining the reflective surface of the prism is formed between neighboring support ribs of the plurality of support ribs.

21. The optical connector of claim 20, wherein
the separation space is open through a front side of the reflective injection-molded part and forms a window in the front side of the reflective injection-molded part.

22. The optical connector of claim 1, wherein
the prism comprises a horizontal surface facing the optical device and parallel to the base substrate, a vertical surface facing an end surface of the optical fiber and perpendicular to the base substrate, and the reflective surface obliquely extending to connect the horizontal surface and the vertical surface to each other.

23. The optical connector of claim 22, wherein
the main block comprises a vertical surface extending in parallel to the vertical surface of the prism, an oblique surface obliquely extending from a side of the vertical surface of the main block, and a horizontal surface extending from another side of the vertical surface of the main block in parallel to the base substrate and adjoining the plurality of support ribs.

24. The optical connector of claim 23, wherein
the plurality of support ribs comprise
first oblique surfaces adjoining the reflective surface of the prism, vertical surfaces extending from the vertical surface of the prism in parallel to the vertical surface of the prism, horizontal surfaces adjoining the horizontal surface of the main block and extending in parallel to the horizontal surface of the main block, and second oblique surfaces obliquely extending from the main block toward the prism to connect the horizontal surfaces to the first oblique surfaces.

25. The optical connector of claim 23, wherein
a bonding space is formed between the horizontal surface of the main block and the base substrate for wire bonding of the optical device, and the bonding space is open to the outside of the reflective injection-molded part.

26. The optical connector of claim 1, wherein
the reflective injection-molded part further comprises a fiber guide to align an end portion of the optical fiber.

27. The optical connector of claim 26, wherein
the end portion of the optical fiber is inserted into an alignment groove of the fiber guide.

28. The optical connector of claim 26, wherein
a clearance is provided between the fiber guide and the prism.

29. The optical connector of claim 28, wherein
the reflective injection-molded part further comprises connection blocks provided on both sides of the clearance to connect the fiber guide and the main block to each other.

30. The optical connector of claim 26, wherein
a front alignment guide configured to align the optical device and a rear alignment guide configured to align the reflective injection-molded part are provided on the base substrate.

31. The optical connector of claim 30, wherein
the front alignment guide comprises a first guide wall and a second guide wall which face each other with the optical device therebetween, and
openings are formed at center positions of the first and second guide walls.

* * * * *